No. 882,124. PATENTED MAR. 17, 1908.
J. F. & R. F. RICHBOURG.
FLY TRAP.
APPLICATION FILED JULY 10, 1907.
2 SHEETS—SHEET 1.
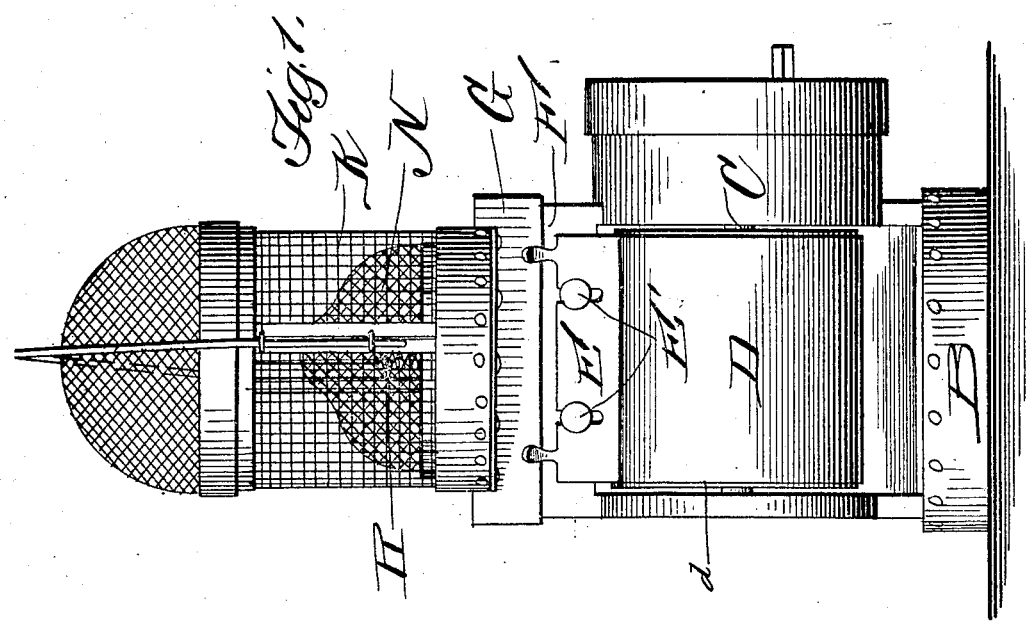
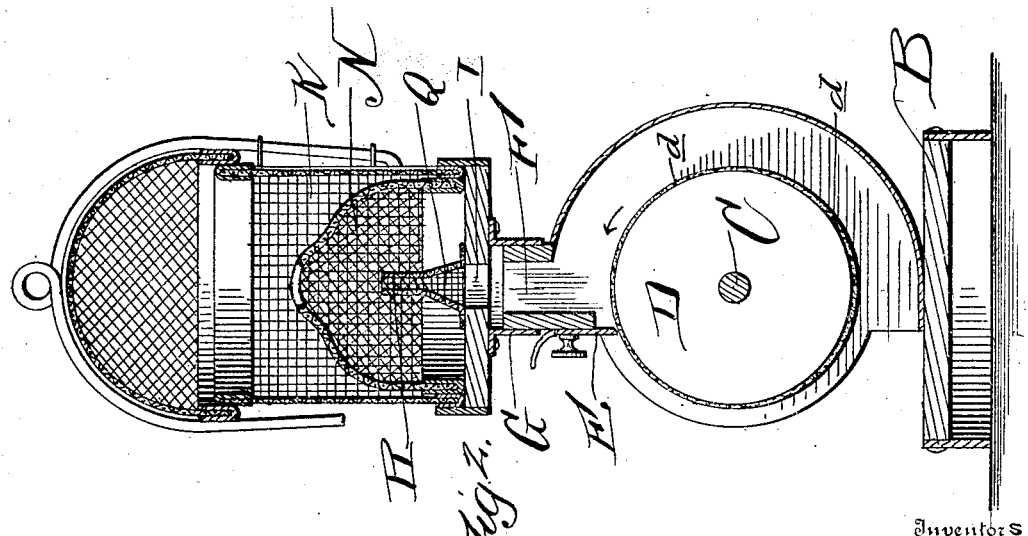
Witnesses
R. L. Boswell.
A. L. Hay.
Inventors
J. F. Richbourg and
R. F. Richbourg,
By Franklin H. Hough
Attorney No. 882,124. PATENTED MAR. 17, 1908.
J. F. & R. F. RICHBOURG.
FLY TRAP.
APPLICATION FILED JULY 10, 1907.
2 SHEETS—SHEET 2.
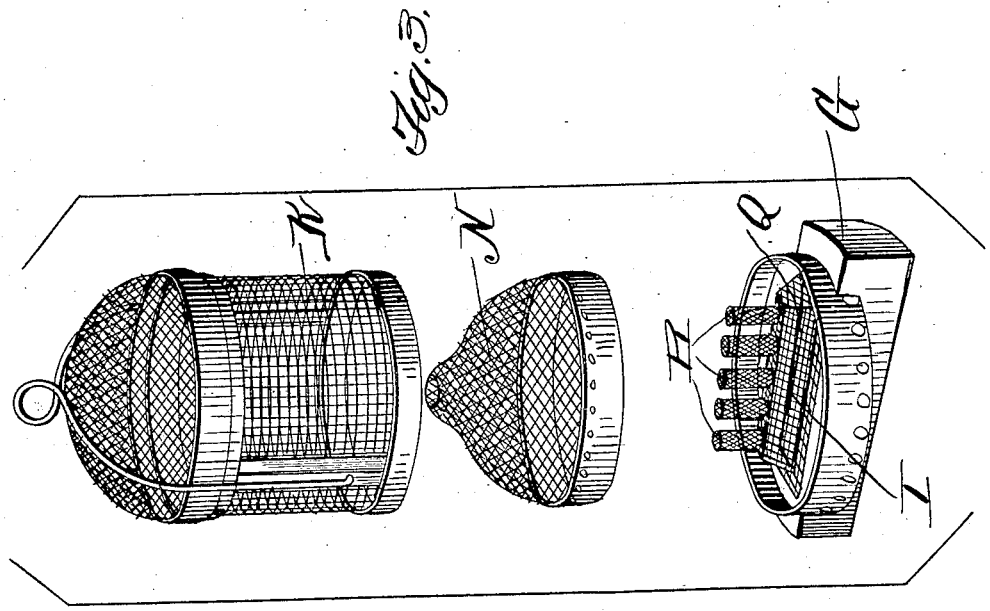
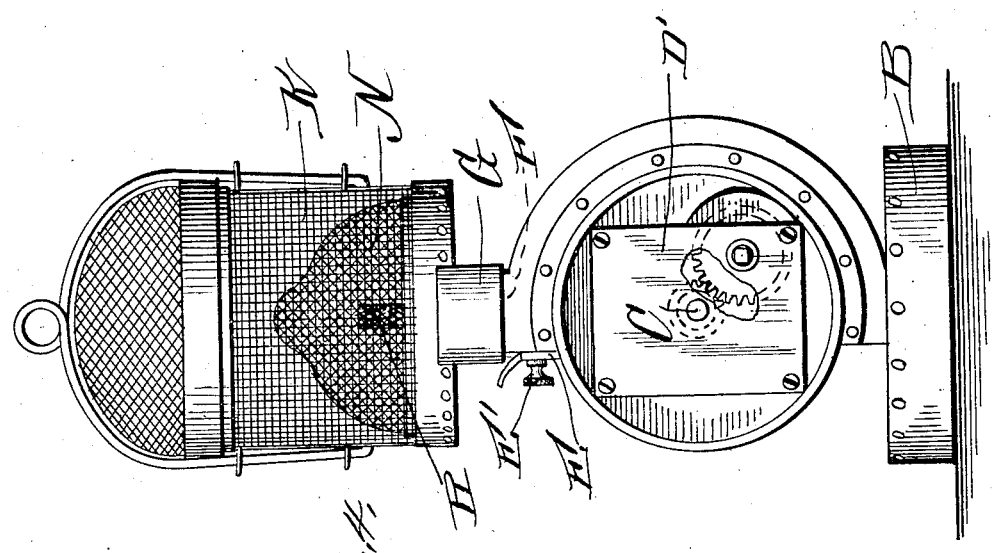
Witnesses
Inventors
J. F. Richbourg and
R. F. Richbourg,
By Franklin N. Hoyt
Attorney

UNITED STATES PATENT OFFICE.

JOSEPH FLETCHER RICHBOURG AND ROBERT FRANKLIN RICHBOURG, OF ALBA, TEXAS.

FLY-TRAP.

No. 882,124.   Specification of Letters Patent.   Patented March 17, 1908.

Application filed July 10, 1907. Serial No. 383,018.

*To all whom it may concern:*

Be it known that we, JOSEPH FLETCHER RICHBOURG and ROBERT FRANKLIN RICHBOURG, citizens of the United States, residing at Alba, in the county of Wood and State of Texas, have invented certain new and useful Improvements in Fly-Traps; and we do hereby declare the following to be a full, clear, and exact description of the invention, such as will enable other skilled in the art to which it appertains to make and use same, reference being had to the accompanying drawings and to the letters and figures of reference marked thereon, which form a part of this specification.

This invention relates to new and useful improvements in fly traps and the object of the invention is to produce a simple and efficient apparatus comprising essentially a rotatable cylinder to be operated by any suitable motor mechanism, the surface of which cylinder is adapted to be coated with a substance which will attract flies, means being provided for scraping flies from the surface of the cylinder and also a cage for containing the captured flies.

The invention consists further in various details of construction and combinations and arrangements of parts which will be hereinafter fully described and then specifically defined in the appended claims.

We illustrate our invention in the accompanying drawings, in which:—

Figure 1 is a side elevation of the apparatus. Fig. 2 is a sectional view. Fig. 3 is a detailed perspective view of the superstructure of the apparatus removed from the casing, and Fig. 4 is an end elevation.

Reference now being had to the details of the drawings by letter, A designates a casing which may be of any size or shape, preferably cylindrical and mounted upon a suitable support B.

C designates a motor shaft mounted in the opposite side walls of the casing and to which a cylinder D is fixed having a coating of fabric *d* adapted to be saturated with a substance which will attract flies. A motor D' of any suitable construction is provided and mounted within the casing and adapted to have gear connection with said shaft, whereby the latter and the cylinder mounted thereon may be given a slow rotary movement within the casing. Substantially one-half of the casing is open offering an inducement for flies to come in contact with the surface thereof.

E designates a slide or scraper, which is adjustably held above the cylinder by means of the screws E' passing through slots formed in one edge of said slide or scraper, the latter being provided for the purpose of scraping off flies from the surface of the cylinder. The upper portion of the casing has a rectangular shaped flue or passageway F over which a similar shaped base G of the superstructure is adapted to telescope. Said base has an elongated slot I formed therein and is fastened to the lower portion of the cage K. Said cage has a conical shaped member N, made preferably of screen wire and provided with an opening at its apex through which flies are allowed to pass into the upper portion of the chamber. Said slot in the base of the superstructure has a covering Q of screen wire, and R designate cylindrical tubular members rising from said screen covering and through which the flies may pass into the lower portion of the screen cage and thence allowed to crawl up through the hole in the apex of said conical shaped member within the cage.

In operation, the surface of the cylinder is coated with a substance for attracting flies and the cylinder given a slow rotary movement in the direction indicated by the arrow. As the cylinder turns within the casing, the scraper being adjusted so that it will wipe against the surface of the cylinder, the flies will be scraped from the surface of the cylinder and allowed to escape up through the slot in the lower portion of the cage where they may be confined.

What we claim to be new is:—

A fly trap comprising a casing, a rotatable cylinder mounted therein, means for operating the same, adjusting screws mounted upon the casing a slide provided with slots adapted to receive said screws, integral handles upon said slide, a cage mounted upon the casing, eyes projecting from said cage, a bail-shaped member passing through said eyes and secured to the cage, as set forth.

In testimony whereof we hereunto affix our signatures in the presence of two witnesses.

JOSEPH FLETCHER RICHBOURG.
ROBERT FRANKLIN RICHBOURG.

Witnesses:
W. A. LAYD,
T. S. RICHBOURG.